United States Patent [19]

Meyer et al.

[11] Patent Number: 5,166,497
[45] Date of Patent: Nov. 24, 1992

[54] FACADE HEATING

[75] Inventors: Horst-Dieter Meyer, Feldkirchen-Westerham; Horst Rothkamm, Deggendorf; Lothar Rudolph, Icking, all of Fed. Rep. of Germany

[73] Assignee: Raychem GmbH, Fed. Rep. of Germany

[21] Appl. No.: 719,217

[22] Filed: Jun. 21, 1991

Related U.S. Application Data

[63] Continuation of Ser. No. 640,535, Jan. 14, 1991, which is a continuation of Ser. No. 250,081, filed as PCT/EP87/00777, Dec. 14, 1987, abandoned.

[30] Foreign Application Priority Data

Dec. 16, 1986 [DE] Fed. Rep. of Germany ....... 3642964

[51] Int. Cl.$^5$ .............................................. H05B 3/14
[52] U.S. Cl. ..................................... 219/213; 219/505
[58] Field of Search .............. 219/203, 213, 218, 504, 219/505; 52/235; 165/53

[56] References Cited

U.S. PATENT DOCUMENTS

| | | | |
|---|---|---|---|
| 624,358 | 5/1899 | Maule | 219/213 |
| 1,143,491 | 6/1915 | Bidwell | 219/213 |
| 1,822,884 | 9/1931 | Creighton | 219/213 |
| 2,546,355 | 3/1951 | Bloomer | 219/213 |
| 2,731,804 | 6/1954 | Grubbs | 62/2 |
| 3,064,110 | 2/1960 | Vogler . | |
| 3,349,220 | 6/1965 | Kinney | 219/218 |
| 3,612,821 | 10/1971 | Stromquish | 219/218 |
| 4,348,584 | 9/1982 | Gale et al. | 219/549 |
| 4,425,497 | 1/1984 | Leary et al. | 219/5441 |
| 4,547,659 | 10/1985 | Leary et al. | 219/544 |
| 4,590,725 | 5/1986 | Kaminaga | 52/235 |
| 4,619,091 | 10/1986 | Gartner | 52/235 |
| 4,661,687 | 4/1987 | Afkhampour et al. | 219/301 |
| 4,673,801 | 6/1987 | Leary et al. | 219/544 |
| 4,689,470 | 8/1987 | Cunningham | 219/213 |

FOREIGN PATENT DOCUMENTS

| | | |
|---|---|---|
| 116985 | 1/1984 | European Pat. Off. . |
| 1804281 | 7/1969 | Fed. Rep. of Germany . |
| 2132921 | 6/1976 | Fed. Rep. of Germany . |
| 3017826 | 5/1980 | Fed. Rep. of Germany . |
| 2942523C2 | 4/1981 | Fed. Rep. of Germany . |
| 3235283A1 | 9/1982 | Fed. Rep. of Germany . |
| 1231239 | 5/1971 | United Kingdom . |
| 2127058 | 8/1982 | United Kingdom . |

*Primary Examiner*—Teresa J. Walberg
*Attorney, Agent, or Firm*—Marguerite E. Gerstner; Timothy H. P. Richardson; Herbert G. Burkard

[57] ABSTRACT

A metal facade construction having a heating device acting as a building heating system in a supporting structure located on the inside of the building can be obtained by arranging, on the supporting structure, heating cables in grooves of the metal profiles forming the supporting structure. These heating cables contain, inside an insulated enclosure, a temperature-sensitive heating conductor material which, in the event of a local temperature increase in a specfic portion of the heating cable, increases its specific resistance in that portion and thereby reduces the heating capacity in order to reduce its temperature in that heating cable portion, so that the heating cable exhibits a self-regulation property over its entire length.

17 Claims, 6 Drawing Sheets

FACADE HEATING

CROSS-REFERENCE TO RELATED APPLICATIONS

This application is a continuation of copending application Ser. No. 07/640,535, filed Jan. 14, 1991, now abandoned, which is a continuation of application Ser. No. 07/250,681, filed as PCT/EP87/00777, Dec. 14, 1987, now abandoned, the disclosure of each of which is incorporated herein by reference.

BACKGROUND OF THE INVENTION

1. Field of the invention

The invention relates to a facade heating arrangement comprising a supporting structure that can be fastened to a wall, usually an outer wall, of a building and which contains profiles, or mullions, usually of metal, particularly aluminium extrusions. The profiles are usually arranged as vertical or upright metal sections and horizontal metal section members or cross members. The structure is connected to and thermally insulated from a facade skin that comprises the uprights and cross members of the outer wall and the window, usually formed from double glazed panels. The facade heating arrangement also comprises a heating device for heating the supporting structure.

2. Description of the invention

A metal facade construction of this type is known, for example, from German Patent Specification 21 32 921. The heating device of the known construction is formed by a hot water circuit which extends through cavities of the metal section uprights and metal section cross members. Owing to the thermal separation between the facade skin and the supporting structure of the facade construction formed by the uprights and cross members, the supporting structure forms a heating body of large area radiating heat substantially only towards the inside of the building, so that, with an appropriate supply of hot water, a building heating system is obtained that can be used for a transition or warm up period, or as an additional heating system that cooperates with other heating systems.

It has been found that the joining together of the hot water channels which extend in the sectional cavities of the uprights and cross members makes the contruction of the facade heating arrangement complicated since a liquid-impermeable connection has to be made and maintained between the uprights and cross members and special precautions have to be taken to avoid short circuits or dead points in the heating circuit.

The heat loss through a window, even a double glazed window, is inherently greater than through a brick wall for example, and a relatively warm person standing in a room near a window with an appreciably lower outside temperature would feel some discomfort.

SUMMARY OF THE INVENTION

It is one object of the present invention to provide a heating arrangement and method safely to overcome or at least alleviate such heat loss and associated personal discomfort.

Accordingly, the invention is intended to solve the problem of so constructing a facade heating construction of the general type described initially that a special, impermeable contruction of the connection between the uprights and the cross members is not necessary, that maintenance and repair work on the heating device and also on the entire facade construction is simplified and a good controllability is achieved that is not dependent on the position of individual temperature sensors, for example on the sunny side or shaded side of the building.

In accordance with one aspect of the present invention, there is provided a facade heating arrangement comprising a thermally conductive support structure arranged to be mounted on the inside of, and to extend away from, a wall of a building adjacent a window therein, and heating means arranged to effect thermal transfer to the support structure and thereby to the atmosphere in front of the window, wherein the thermally conductive support structure comprises an elongate profile having a groove therein, the heating means comprises an elongate electrical heater that has a negative temperature coefficient of heating capacity, and wherein the heater is mounted in the groove so as to effect good thermal transfer from the heater to the profile.

In accordance with another aspect of the present invention, there is provided a method of heating the atmosphere inside a building adjacent a window in a wall thereof, wherein a thermally conductive support structure is mounted on the inside of said wall adjacent the window so as to extend away therefrom, wherein an elongate heater having a negative temperature coefficient of heating capacity is mounted in a groove of an elongate profile of the support structure so as to effect good thermal transfer to the profile and thereby to the atmosphere adjacent the window.

Advantageously, the heater comprises a heater cable having a positive temperature coefficient (PTC) of resistivity, and comprises an elongate cable having a pair of parallel stranded metal bus bar conductors enclosed within a conductive polymeric material having a PTC characteristic, and surrounded by an insulating jacket.

In addition to solving the problem stated above, the construction of the electrical heating device described herein makes is possible also to carry out repair work in specific areas of the facade without it being necessary to shut down the heating device in the other heated parts of the facade. So called hot spots on the heat-radiating surfaces of the uprights and cross members that face the interior of the building are avoided by virtue of the self-regulating property of the heating cable arising from its PTC characteristic. This heating cable is preferably arranged in such a manner that its two stranded conductors which run parallel to and spaced from each other by being embedded in a conductive polymer can be supplied, for example, by 220 volt alternating current. The temperature-sensitive resistance material located between the heating cables forms the heat-resistance over the entire length of the heating cable. This heat-resistance may be considered as a number of heat-resistance elements connected in parallel with each other which, owing to the positive temperature coefficient of their resistance, effect the self-regulation of the heating cable by means of those heat-resistance elements which adopt higher temperatures owing to thermal irregularities in the system increasing their resistance value, reducing the current passing through them and, thereby, decreasing the reduction in the heating capacity in the relevant heat-resistance element in order to lower the temperature. A polymeric carrier matrix which contracts on cooling and expands on heating, contains conductive particles, especially carbon particles, which come increasingly into contact on cooling to produce more conductive pathways, but, on heating, are drawn apart and increasingly lose contact with each other with a reduction in the overall effective conductor cross-section.

Each individual section of the heating cable has this self-regulating property over its entire length, so that no separate control circuits, such as thermostats, are required in order, for example, to adjust the heat energy delivered for each portion of the facade according to whether the respective portion is on the sunny, shady or windy side of the building or is located in a region of the building in which additional heat sources operate.

The self-regulating property of the heating cable can be obtained also with other physical principles or mechanisms. For example, as the heating means in the heating cable, a lossy dielectric having a negative temperature coefficient of power loss may lie between the conductors of the cable, or heating conductors having a pronounced positive temperature coeficient of resistance may be wrapped in the form of a helix around connection conductors extending on opposite sides of a spacer strip, so that the individual portions of the helix between the connection conductors form the parallel-connected heating elements.

The heater used in the present invention may be a self-regulating heater sold by the Chemelex Division of Raychem, and preferably is selected, according to the power output required, from Raychem's QTV range, for example a 10 QTV 2 or a 15 QTV 2 heater. In general, suitable heaters for use in the present invention are described for example in Raychem's U.S. Pat. Nos. 4,188,276, 4,459,473, and 4,426,339, the entire contents of which are included herein by this reference. The heaters may be enclosed within a metal braid or foil for earthing and/or enhancing thermal transfer.

A further advantage of the self-regulating heater used in the present invention over the hot water system previously used for facade heating, lies in its ability to limit the temperature to which the profiles, or mullions, of the facade support structure may be raised. This temperature may thus be maintained at less than about 55° C., which is the temperature at which injury could be caused to a person touching the support structure.

In general, the support structure will comprise one or more, and usually four, profiles that form a closed, usually rectangular, loop for mounting around a window. Each profile may contain a separate heating element, or a single heater may extend along the lengths of each of the profiles. The size, i.e. total length, of the support structure will, of course, depend on the size of the window, and it would extend away from the wall into the room typically for a depth of about 15 centimeters. The thermal transfer mechanisms are typically thermal conduction from the heater into the support structure profiles, usually an aluminium or other metal extrusion, and then radiation, and/or convection, from the support structure inwardly towards the air in front of the window. The depth of the support structure will accordingly be chosen in dependence on the surface area of the window so as to maintain a specified minimum temperature, of say 18° C. at the center of the window.

The heater may be mounted as a snap-fit into the groove, so that the good mechanical retention will enhance the thermal transfer. Thermal transfer from the heater may be further enhanced by embedding the heater in a potting compound or other material having good thermal conductivity. The groove containing the heater may be closed by a cover, which may itself be a snap-fit on or in the groove, or may be secured by clips or screws.

Advantageously, the groove or grooves containing the heater or heaters open into the room so that should any maintenance or replacement of the heating system be necessary, access thereto is easily obtained without disturbing the mounting of the support structure on the wall.

When the support structure is mounted on the wall, it is preferred that it be thermally insulated therefrom, thereby to enhance the proportion of heat that is radiated across the surface of the window.

BRIEF DESCRIPTION OF THE DRAWING

Embodiments of facade heating arrangements, each in accordance with the present invention, will now be described, by way of example, with reference to the accompanying drawings, in which.

DESCRIPTION OF THE PREFERRED EMBODIMENT

Figure 1:
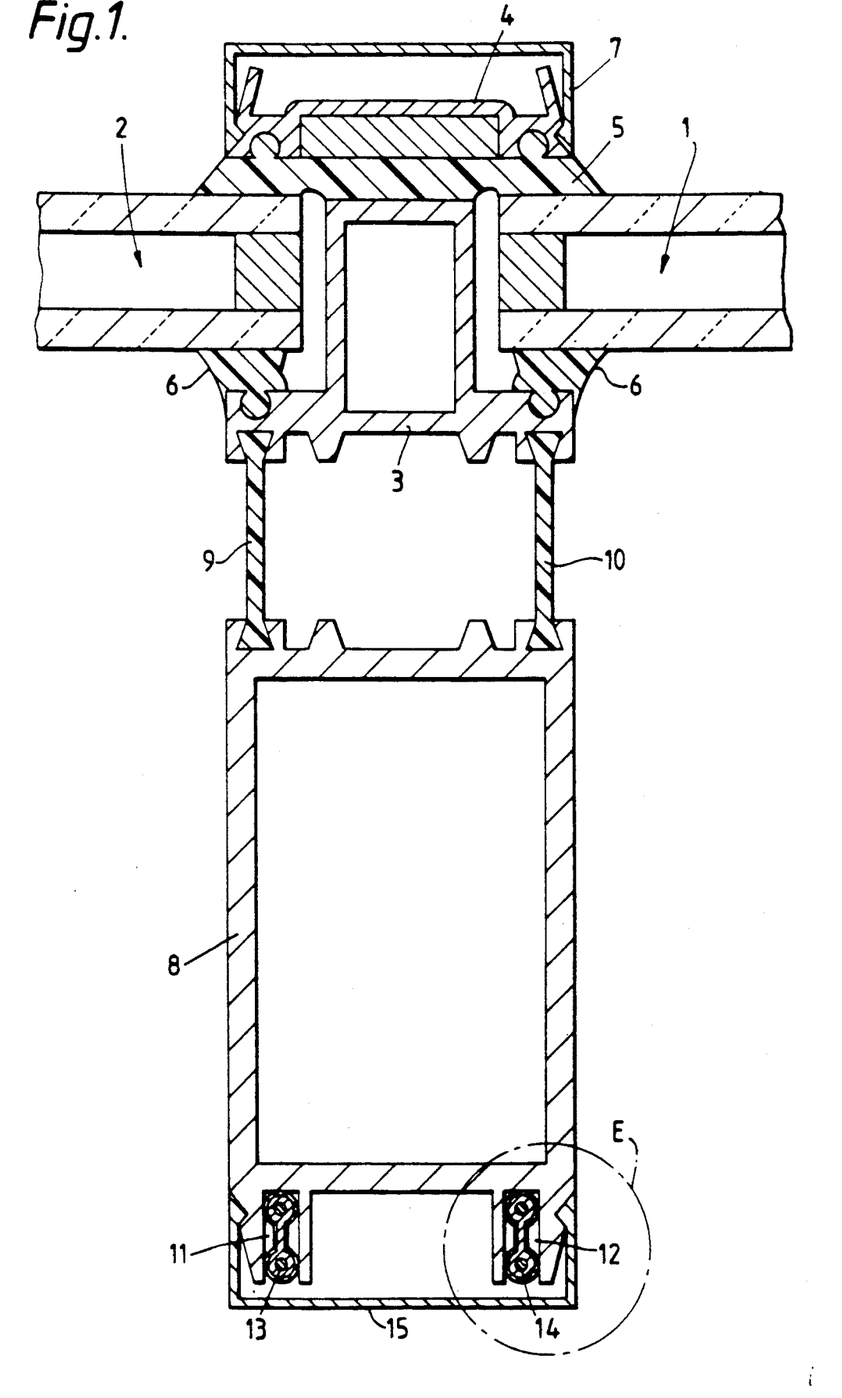
FIG. 1 shows a horizontal section through the metal facade construction, in the region of a upright; it should be mentioned that the view in FIG. 1 may also be regarded as a vertical section through the metal facade construction in the region of a horizontal cross member.

In FIG. 1, two adjacent double glazing panels are designated 1 and 2. The insulating glass panels 1 and 2 are held between a metal framework 3 on the inside of the room of a building and a metal framework member 4 on the outside of the room. Elastic mounting elements 5 and 6 separate the framework members 3 and 4, which are clamped together, for example, by means of screws. Details of this arrangement have been omitted from the drawing for the sake of clarity since they are known to a person skilled in the art. On the ouside of the building, a cover 7 is clipped, using suitable locking means, on to the outer framework member 4 over the exposed fastening points.

The elastic mounting elements 5 and 6 form a first thermal insulation of the metal facade construction, this thermal insulation acting between the outer framework member 4 and the inner framework member 3. A second thermal insulation of the metal facade construction is provided between the inner framework member 3 and a hollow section 8 of substantially rectangular cross-section which forms an upright member (or alternatively a cross member), and takes the form of two insulating webs 9 and 10 made of high-rigidity plastics material which are each anchored by dove-tail extensions in correspondingly constructed grooves of the metal sections 3 and 8.

Figure 2:
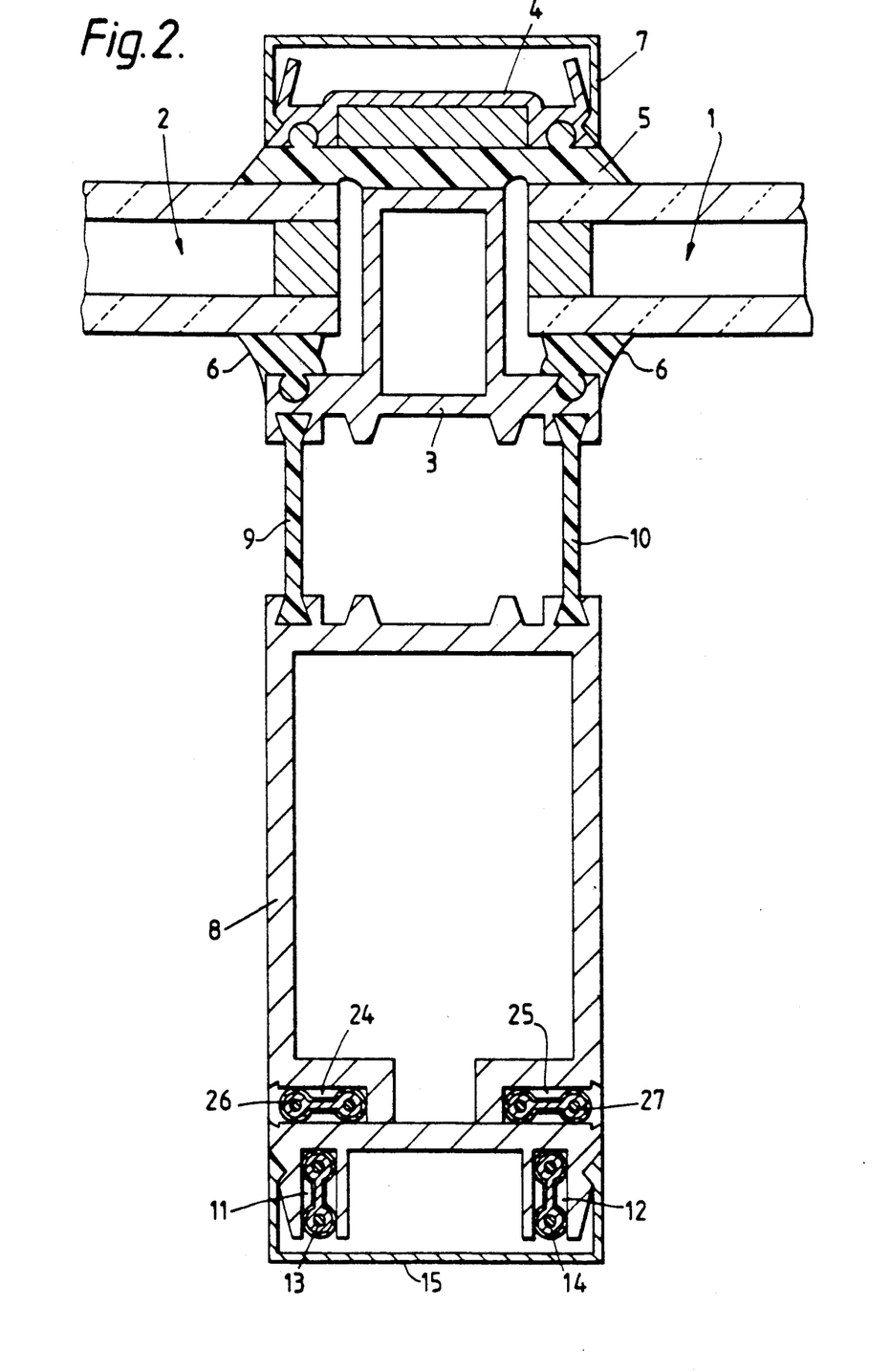
FIG. 2 shows a cross-section of a modification of FIG. 1, wherein, in the region of a upright or cross member, additional profile grooves having additional heating cables have been provided.
Figure 3:
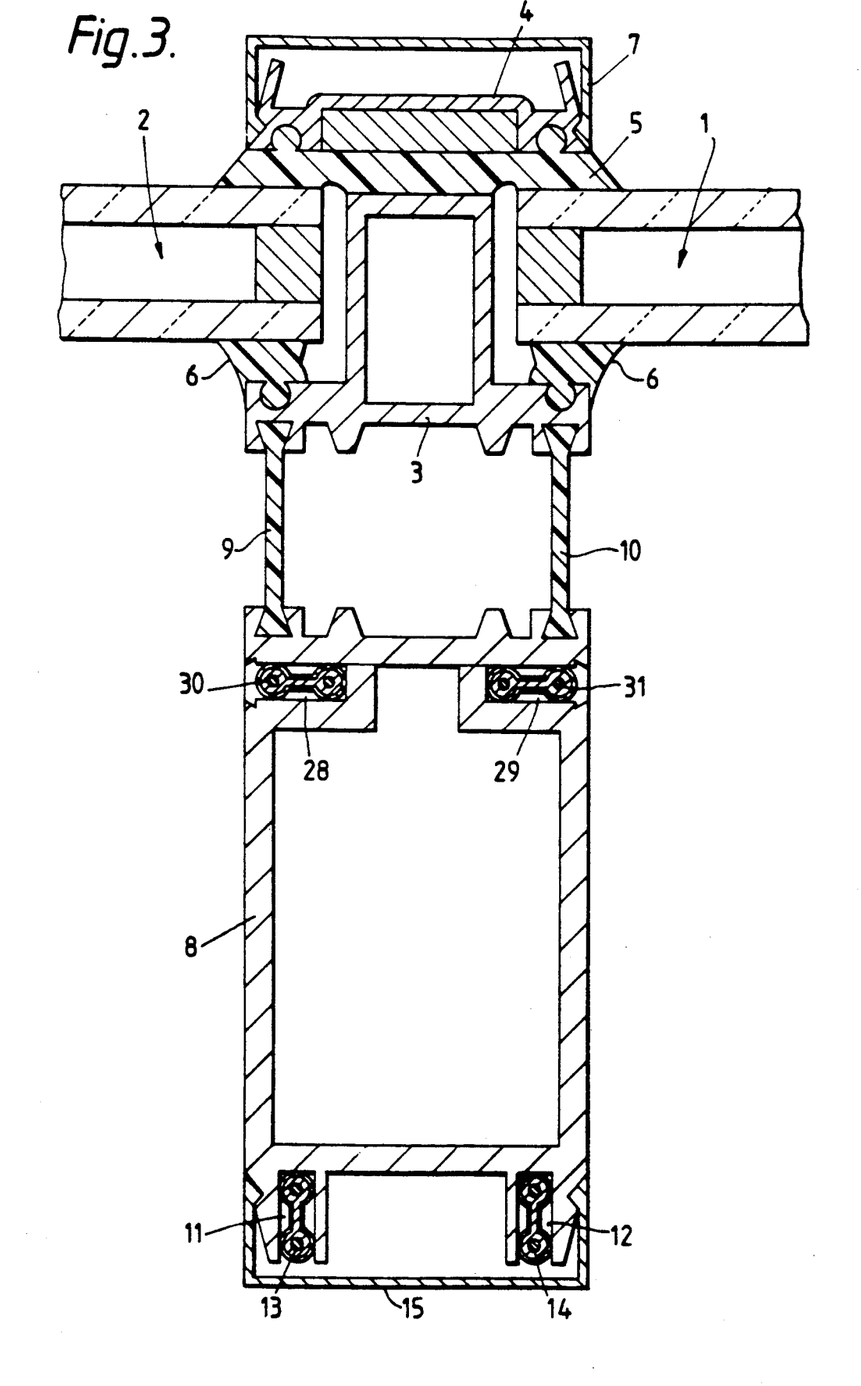
FIG. 3 shows a cross-section of a further modification of FIG. 1.

On its innermost side within the room, the hollow section 8 is provided with grooves 11 and 12 which open towards the inside of the building and which, in the embodiments shown in FIGS. 1 to 3, are formed by flanges projecting away from the inside profiled outer surface of the box section. According to an alternative embodiment (not shown in the drawings) these grooves may, however, also be positioned inside the rectangular outer contour of the hollow section 8.

Heating cables 13 and 14 which are generally dumb-bell shaped in cross-section extend inside the grooves 11 and 12, respectively, in the longitudinal direction of the hollow section 8, which heating cables fill the relevant groove to provide a good transfer of heat between the heating cables and the hollow section 8.

For covering the groove opening, a cover strip 15 of U-shaped cross-section is clipped on to the hollow section 8 in the manner shown in FIG. 1, which cover strip is constructed in such a manner that substantially closed, smooth outer surfaces are produced on the sides and at the end face of the hollow section 8. The inner cover strip 15 corresponds in shape substantially to the outer cover strip 7, and it is possible to use identical covers in order to simplify manufacture and make storage cheaper.

Figures 5, 6:
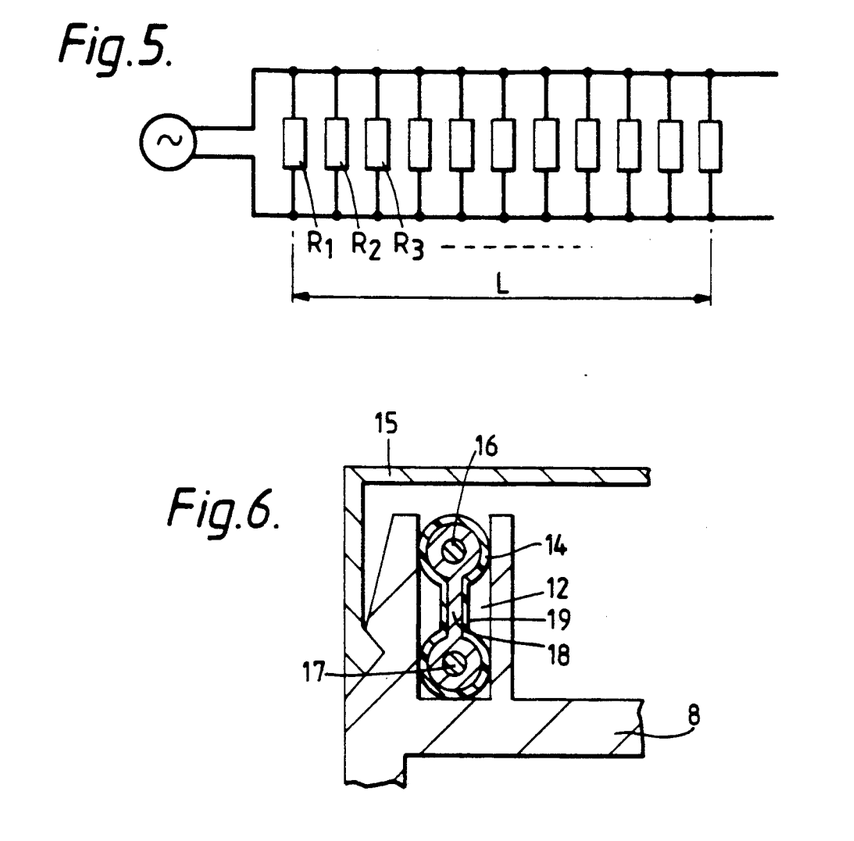
FIG. 5 shows a schematic equivalent circuit diagram of a heating cable portion.
FIG. 6 shows an enlarged view in section of a part of a upright or cross member in the region of a profile groove containing a heating cable.

FIG. 6 shows the detail designated E in FIG. 1 on an enlarged scale and again shows the cover strip 15 and the groove 12 which is formed between the flanges projecting above the outer surface of the hollow section 8 on the inside of the building. The flange located near the corner of the hollow section 8 is provided on the outside with a longitudinally extending channel in which an engaging strip of one limb of the cover strip 15 has been engaged.

As already described, inside the groove 12 there extends the heating cable 14 which, owing to the appropriate sizing of the groove 12 with respect to the cross-section of the heating cable, rests against the side walls and on the base of the groove and is spaced at a slight distance from the cover strip 15, so that a good transfer of heat to the parts of the metal section adjacent to the heating cable is brought about by thermal conduction and/or thermal radiation.

If, despite a relatively uniform removal of heat from the heating cable 14 to the adjacent parts of the metal profile and despite a heat distribution action as a result of the transport of heat in the longitudinal direction of the metal profile, the temperature in a heating cable portion designated L in FIG. 5 rises in comparison with adjacent heating cable portions, then, owing to the self-regulating properties of the heating cables used here, there is a reduction in the current flowing between the parallel stranded conductors 16 and 17 as a result of the heating conductor material 18 arranged and electrically connected between the stranded conductors. This material can be regarded as a parallel connection of heat resistance elements $R_1$, $R_2$, $R_3$ ... of the equivalent circuit diagram shown in FIG. 5. Because of the voltage applied to the conductors 16 and 17 which is substantially constant along the relatively short length of the heating cable portion, this causes a reduction in the heating capacity at those heating conductor resistance elements which have heated up more, so that the temperature falls again. The heater is thus self regulating.

It should also be mentioned that the stranded conductors 16 and 17 of the heater cable 14 and the heating conductor material 18 which surrounds and connects them are covered by an insulation sheath 19 which ensures electrical insulation with respect to the metal profiles without significantly hindering the transport of heat.

Figure 7:
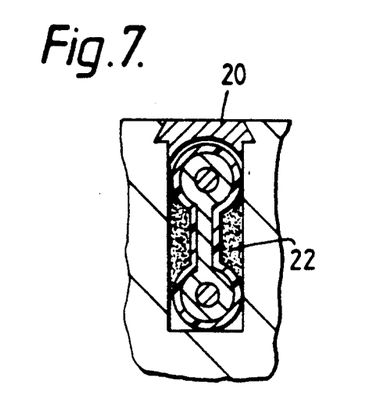
FIGS. 7 & 8 show enlarged views in section of modified embodiments of FIG. 6.
Figure 8:
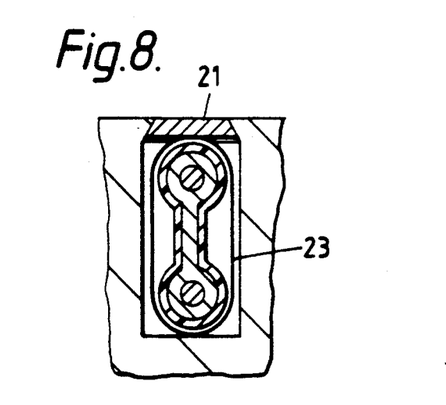
Figure 9:
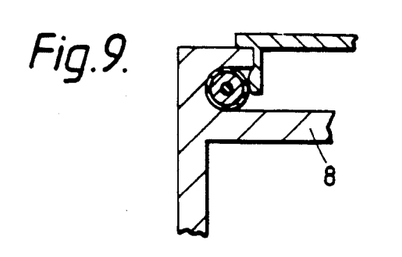
FIGS. 9 to 13 shows a range of other shapes of profile grooves with heating cables extending therein showing, in section, part of the corner region of a cross member or upright.
Figure 10:
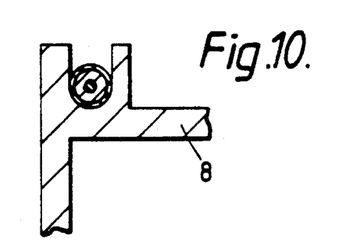
Figure 11:
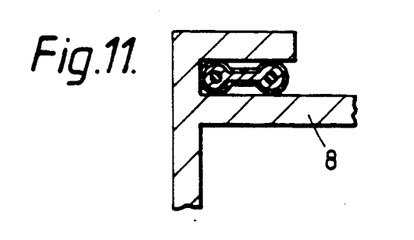
Figure 12:
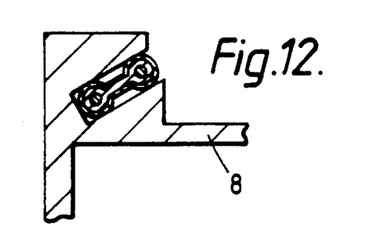

FIGS. 7 and 8 show embodiments in which a self-regulating heating cable is placed in a metal profile groove and the groove opening has then been closed by a comparatively narrow cover strip 20 or 21, it being possible for the cover strip 20 or 21 to be locked on the groove opening in the manner shown in FIGS. 8 and 9. The cover strip 20, which may be made of metal or of a heat-conductive plastics material, is so dimensioned on its inwardly facing side that it is contiguous with the upper end of the heating cable cross-section, for example of the heat cable 14, in order to conduct heat away. A further improvement in the removal of heat from the heating cable to the adjacent surfaces of the parts of the metal profile is achieved in the embodiment shown in FIG. 7 by a casting compound 22 having good thermal conductivity, in which the heating cable is embedded inside the profile groove. In the embodiment shown in FIG. 8, a metal foil sheath 23 on the heating cable likewise serves to improve the transfer of heat between the heating cable and the adjacent surfaces of the metal profile.

In the embodiment shown in FIG. 2, in addition to the grooves 11 and 12 with heating cables 13 and 14 accommodated therein, further profile grooves 24 and 25 with heating cables 26 and 27 inserted therein are provided. The grooves 24 and 25 open on the hollow section 8 in a direction parallel to the window, it being possible to provide for these grooves and the heating cables accommodated therein a construction such as that shown in FIGS. 7 and 8. It will be appreciated that in the embodiment shown in FIG. 2, as a modification of the construction shown, the grooves 11 and 12 with the flanges forming them may also be omitted, so that the hollow profile 8 presents a smooth surface towards the inside of the building. This form of construction is suitable for those uprights and cross members of a metal facade construction that are situated immediately in front of a ceiling or an internal wall of a building, so that the grooves are freely accessible for receiving heating cables in the hollow profile 8.

The explanation just given for the embodiment shown in FIG. 2 applies correspondingly to the embodiment shown in FIG. 3. The facade construction of FIG. 3 differs, however, from that shown in FIG. 2 in that grooves 28 and 29 for receiving heating cables 30 and 31, respectively, which open parallel to the window are not arranged near the surface of the hollow section 8 that faces the inside of the building but are provided on the hollow profile 8, in the manner shown, in the vicinity of the thermal insulations formed by the insulation strips 9 and 10 towards the framework member 3.

Figure 4:
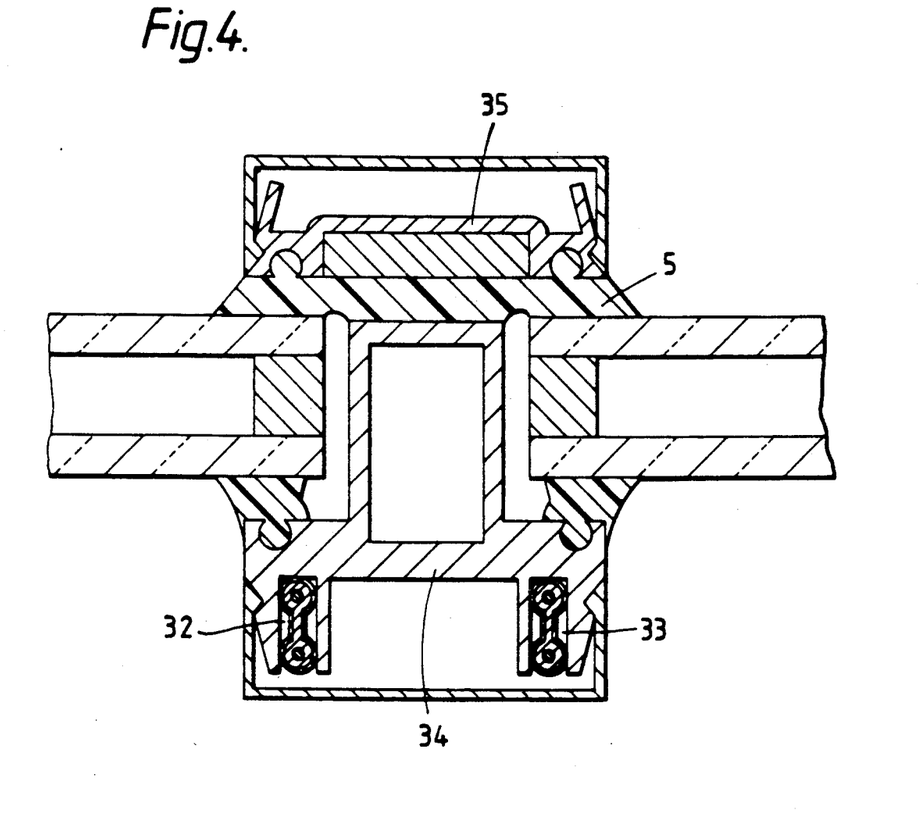
FIG. 4 shows a cross-section of a part of a metal facade construction in which the metal sections of the supporting structure which form the uprights have been omitted, wherein that part of a profiled framework which lies on the inside of the building and which is thermally insulated towards the outside of the building is to be regarded as a cross member which is provided with grooves opening towards the inside of the building for receiving heating cables.

Finally, FIG. 4 shows a metal facade construction in which grooves 32 and 33 which receive heating cables are located, in a manner corresponding to the construction of the grooves 11 and 12 in the embodiment shown in FIG. 1, on the surface of the metal framework member 34 that faces the inside of the building, which framework member corresponds to the framework member 3 of the embodiment shown in FIG. 1. Owing to the thermal insulation between the inner framework member 34 and an outer framework member 35 which is obtained as a result of the elastic mounting element 5, the heat produced by the heating cables at the inner framework member 34 substantially is not conducted towards the outside of the building to the framework member 35 but is effective for radiant heating of the interior of the building.

FIGS. 9 to 13 show further embodiments of grooves fitted to the metal uprights (profiles) and/or the metal cross members (profiles). These grooves, as in the exemplary embodiments described previously, are each an integral component of the relevant metal profile and are adapted to the particular cross-sectional shape of the heating cable. In the embodiments shown in FIGS. 9 and 10, a heating cable of circular cross-section is used, but it should be pointed out that heating cables of rectangular or oval cross-section may also be used In the embodiments shown in FIGS. 11 and 12, the grooves receiving the heating cables are fitted to the relevant upright or the relevant cross profile in such a manner that the grooves open towards each other and the heating cables are pushed into the grooves outwards from the center of the enclosure formed around the window by the profiles, or mullions.

Figure 13:
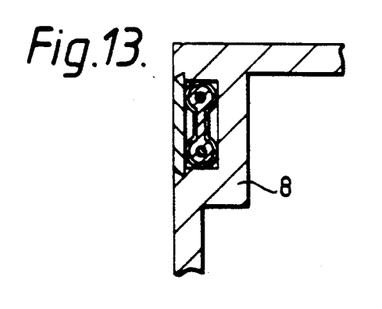

FIG. 13 shows the larger cross-sectional dimension of the ribbon-shaped heating cable oriented perpendicular to the plane of the facade. It will be seen that, in this embodiment, the groove receiving the heating cable is comparatively flat. At the transition of the groove from a upright to a cross member in the corner region of the supporting structure, the ribbon-shaped heating cable can be bent easily and does not need to be bent on its edge.

Figure 14:
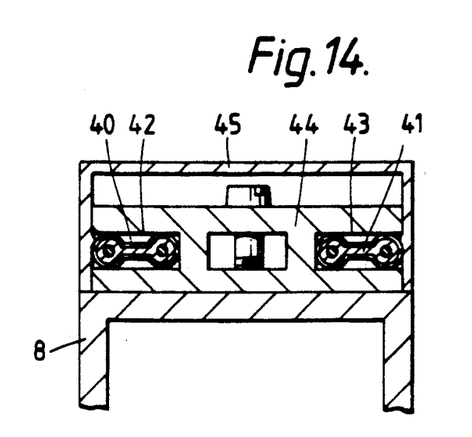
FIG. 14 shows a section through a upright or cross member to which the grooves carrying the heating cables have been fitted by fastening a groove carrier.

Whereas in the embodiments described previously, the parts of the metal profile or mullion containing the heating cables and the grooves are integrally connected to the upright or cross member of a framework, in the embodiment shown in FIG. 14 a heating cable carrier 44 is in the form of a correspondingly shaped metal profile strip containing the heating cables 40 and 41 in grooves 42 and 42, respectively, which open at the side. The carrier 44 is fastened, for example firmly screwed, to the hollow section 8 of a upright or cross member. The entire arrangement can be covered by a cover strip 45 in the manner shown, the cover strip 45 also serving to close off the profile grooves 42 and 43. The embodiment shown in FIG. 14 has the advantage that even already erected facades can subsequently be equipped with a heating device of the kind described herein, so that this embodiment is suitable for reconstruction measures. Thermally conductive inserts between the hollow section 8 and the heating cable carrier 44 are able to ensure a good transfer of heat as result of a reliable mechanical contact between these parts.

We claim:

1. A facade heating arrangement comprising a thermally conductive support structure arranged to be mounted on the inside of, and extending away from, a wall of a building adjacent a window therein, and heating means arranged to effect thermal transfer to the support structure and thereby to the atmosphere in front of the window, wherein (1) the thermally conductive support structure comprises an elongate profile having a groove therein, (2) the heating means comprises an elongate electrical heater that has a positive temperature coefficient of resistance, and (3) the heater is mounted in the groove so as to effect good thermal transfer from the heater to the profile.

2. An arrangement according to claim 1, wherein (1) the thermally conductive support structure comprises one or more of said profiles arranged in a substantially closed configuration, so as in use to substantially completely surround the window, and (2) one or more of said heaters extends in grooves along said profile configuration.

3. An arrangement according to claim 1, wherein the or each heater is mounted as a snap-fit into its respective groove.

4. An arrangement according to claim 1, wherein the or each heater is embedded in its respective groove in a material having good thermal conductivity, thereby to enhance said thermal transfer.

5. An arrangement according to claim 1, wherein the or each groove has a cover secured thereto, thereby enhancing thermal transfer from the enclosed heater to its associated profile.

6. An arrangement according to claim 1, wherein the thermally conductive support structure comprises one or more elongate metal extrusions.

7. An arrangement according to claim 1 which, when mounted on the inside wall of a building adjacent a window therein, comprises thermal insulation means disposed between the arrangement and the wall, thereby hindering thermal conduction from the arrangement to the window.

8. A facade heating arrangement comprising a thermally conductive support structure arranged to be mounted on the inside of, and to extend away from, a wall of a building adjacent a window therein, and heating means arranged to effect thermal transfer to the support structure and thereby to the atmosphere in front of the window, wherein (1) the thermally conductive support structure comprises an elongate profile having a groove therein, (2) the heating means comprises an elongate electrical heater that has a positive temperature coefficient of resistance, and (3) the heater is mounted in the groove and is embedded in a material having good thermal conductivity so as to effect good thermal transfer from the heater to the profile.

9. An arrangement according to claim 8, wherein (1) the thermally conductive support structure comprises one or more of said profiles arranged in a substantially closed configuration, so as in use to substantially completely surround the window, and (2) one or ore of said heaters extends in grooves along said profile configuration.

10. An arrangement according to claim 8, wherein the heater is mounted as a snap-fit into its groove.

11. An arrangement according to claim 8, wherein the groove has a cover secured thereto, thereby enhancing thermal transfer from the enclosed heater to its associated profile.

12. An arrangement according to claim 8, wherein the thermally conductive support structure comprises one or more elongate metal extrusions.

13. An arrangement according to claim 8 which, when mounted on the inside wall of a building adjacent a window therein, comprises thermal insulation means disposed between the arrangement and the wall, thereby hindering thermal conduction from the arrangement to the window.

14. A method of heating the atmosphere inside a building adjacent a window in a wall thereof, said method comprising
   (1) mounting a thermally conductive support structure on the inside of said wall adjacent the window so as to extend away therefrom, and
   (2) mounting an elongate heater having a positive temperature coefficient of resistance in a groove of an elongate profile of the support structure and embedding the heater in a material having good thermal conductivity so as to effect good thermal transfer to the profile and thereby to the atmosphere adjacent the window.

15. A method according to claim 14, wherein (1) the heater is mounted in the profile so as to effect good thermal transfer thereto by the process of thermal conduction, and (2) the support structure is mounted on the wall so as to effect good thermal transfer to the atmosphere adjacent the window by the process of thermal radiation and/or convection.

16. A method according to claim 14, wherein the support structure is mounted on the wall so as to substantially completely surround the window.

17. A metal according to claim 14 wherein the thermally conductive support structure comprises an elongate profile having a groove therein.

* * * * *

UNITED STATES PATENT AND TRADEMARK OFFICE
CERTIFICATE OF CORRECTION

PATENT NO. : 5,166,497                                Page 1 of 2
DATED      : November 24, 1992
INVENTOR(S): Horst-Dieter Meyer, et al It is certified that error appears in the above-indentified patent and that said Letters Patent is hereby corrected as shown below:

On title page, item [75], line 4, after "Rudolph, Icking," insert --Paul Jordan, Konstanz,--.

On title page, item [56], References Cited, U.S. Patent Documents, line 6, after "Vogler" insert --219/19--.

Title page, item [63], and col. 1, line 9, replace "filed as PCT/EP87/00777, Dec. 14, 1987," should read --filed April 7, 1989,--

Column 1, line 28, replace "invention" by --Related Prior Art--.

Column 3, line 19, replace "coeficient" by --coefficient--.

Column 4, line 21, replace "a upright;" by --an upright;--.

Column 4, line 26, replace "a upright" by --an upright--.

Column 4, line 44, replace "a upright" by --an upright--.

UNITED STATES PATENT AND TRADEMARK OFFICE
CERTIFICATE OF CORRECTION

PATENT NO. : 5,166,497
DATED : November 24, 1992
INVENTOR(S) : Horst-Dieter Meyer, et al It is certified that error appears in the above-indentified patent and that said Letters Patent is hereby corrected as shown below:

Column 4, line 48, replace "shows" by --show--.

Column 4, line 52, replace "a upright" by --an upright--.

Column 4, line 67, replace "ouside" by --outside--.

Column 7, line 41, replace "a upright" by --an upright--.

Column 7, line 52, replace "42 and 42," by --42 and 43,--.

Col. 8, claim 9, line 57, replace "ore" by --more--

Signed and Sealed this

Eighteenth Day of January, 1994

Attest:

BRUCE LEHMAN

*Attesting Officer*  *Commissioner of Patents and Trademarks*